Patented Dec. 18, 1934

1,984,480

UNITED STATES PATENT OFFICE 1,984,480

MANUFACTURE OF PENTAVALENT ANTIMONY COMPOUNDS

Albert Leon Henne, Columbus, Ohio, assignor, by mesne assignments, to General Motors Corporation, a corporation of Delaware No Drawing. Application June 5, 1931, Serial No. 542,468. Renewed January 9, 1934

11 Claims. (Cl. 23—98)

This invention relates to the manufacture of a pentavalent antimony compound containing fluorine and another halogen.

The objects of my invention are to provide an improved method of manufacturing a pentavalent antimony compound, substantially of the formula $SbF_3X_2$ where X is any halogen other than fluorine, by interacting a halogen with a solution of antimony trifluoride in antimony trichloride and/or antimony pentachloride.

As a specific example of one mode of carrying out my invention, I mix about 10 pounds of antimony trichloride with 90 pounds of antimony trifluoride. The mixture is slightly heated. At substantially 70° C. the antimony trichloride begins to melt and gradually dissolves the antimony trifluoride. Chlorine is then interacted with the solution forming antimony trifluorodichloride and antimony pentachloride.

The reaction is substantially as follows:

$$SbF_3 + SbCl_3 + 2Cl_2 = SbF_3Cl_2 + SbCl_5.$$

The reaction is carried to completion in about two hours.

In the above mode, chlorine may be interacted with the mixture of $SbF_3$ and $SbCl_3$ without first heating to the melting point of $SbCl_3$. In this instance, the interaction of the chlorine with the $SbF_3$ and the $SbCl_3$ will produce sufficient heat to gradually melt the $SbCl_3$ to dissolve the $SbF_3$ therein.

A second mode of carrying out my process consists in adding about 90 pounds of $SbF_3$ to about 10 pounds of $SbCl_5$. The $SbCl_5$ gradually dissolves the $SbF_3$. Chlorine is interacted with the solution to form $SbF_3Cl_2$. The reaction goes to completion in about two hours.

This reaction is substantially as follows:

$$SbF_3 + SbCl_5 + Cl_2 = SbF_3Cl_2 + SbCl_5.$$

In both of the above modes, the interaction between the chlorine and the other reactants produces sufficient heat to maintain the mass at reacting temperatures without the application of external heat.

Corresponding compounds containing bromine and/or iodine, such as $SbF_3Br_2$ and $SbF_3I_2$ are obtained in place of the chloro compounds by interacting a solution of $SbF_3$ in $SbCl_3$ and/or $SbBr_3$ with bromine and/or iodine respectively.

Interaction takes place according to the following formula:

$$SbF_3 + SbCl_3 + 2Br_2 = SbF_3Br_2 + SbCl_3Br_2$$
$$SbF_3 + SbCl_3 + 2I_2 = SbF_3I_2 + SbCl_3I_2$$
$$SbF_3 + SbBr_3 + 2Br_2 = SbF_3Br_2 + SbBr_5$$
$$SbF_3 + SbBr_3 + 2I_2 = SbF_3I_2 + SbBr_3I_2$$

Heretofore in the manufacture of compounds having the formula $SbF_3X_2$, where X is a halogen other than fluorine, the halogen has been interacted with the solid $SbF_3$. This reaction, although it has successfully produced the desired compound, has had practical disadvantages. For example, the reaction has taken place very slowly and with considerable foaming and has not been carried to completion. By my process the difficulties encountered in working with a solid material such as $SbF_3$ are overcome. Consequently, the reaction is carried to completion in a short time and without any foaming.

The mixture including the compound $SbF_3X_2$, where X is a halogen other than fluorine, obtained from the above reactions may be used directly as a fluorating agent in the production of halo-fluoro derivatives of aliphatic hydrocarbons. Or, if desired, the compound $SbF_3X_2$, where X is a halogen other than fluorine, may be separated from the other compound contained in the final mixture by distillation.

The term solvent as used throughout the specification and claims is intended to include only those compounds such as $SbCl_3$ or $SbCl_5$ which do not materially react with or damage the solute and do not form with the chlorine or other halogen, compounds difficult to separate from the pentavalent antimony compound formed.

What is claimed is as follows:

1. Process which comprises dissolving $SbF_3$ in a solvent and interacting the solution with a halogen other than fluorine to form $SbF_3X_2$ where X is the halogen used in the reaction.

2. Process which comprises dissolving $SbF_3$ in $SbCl_3$ and interacting the solution with a halogen other than fluorine to form $SbF_3X_2$ where X is the halogen used in the reaction.

3. Process which comprises dissolving $SbF_3$ in $SbCl_3$ and interacting the solution with chlorine to form $SbF_3Cl_2$.

4. Process which comprises dissolving $SbF_3$ in $SbBr_3$ and interacting with Br to form $SbF_3Br_2$.

5. Process which comprises dissolving SbF$_3$ in SbCl$_5$ and interacting the solution with chlorine to form a pentavalent antimony compound containing two halogens.

6. Process which comprises dissolving SbF$_3$ in SbCl$_3$ and interacting the solution with a halogen other than fluorine to obtain a pentavalent antimony compound containing two halogens.

7. Process which comprises dissolving SbF$_3$ in SbCl$_5$ and interacting the solution with a halogen other than fluorine to obtain a pentavalent antimony compound containing two halogens.

8. Process which comprises dissolving SbF$_3$ in an antimony halide other than a fluoride and interacting the solution with a halogen other than fluorine to obtain a pentavalent antimony compound containing two halogens.

9. Process which comprises dissolving SbF$_3$ in SbCl$_3$ and interacting the solution with chlorine to form a pentavalent antimony compound containing two halogens.

10. Process which comprises dissolving SbF$_3$ in SbBr$_3$ and interacting the solution with bromine to form a pentavalent antimony compound containing fluorine and bromine.

11. Process which comprises dissolving SbF$_3$ in a solvent and interacting the solution with a halogen other than fluorine to form SBF$_a$X$_{5-a}$ where X is the halogen other than fluorine.

ALBERT LEON HENNE.